(No Model.) 2 Sheets—Sheet 1.

P. ARGALL.
APPARATUS FOR EXTRACTION OF PRECIOUS METALS.

No. 549,622. Patented Nov. 12, 1895.

Witnesses.
W. R. Edelen.
[signature]

Inventor.
Philip Argall
by Pollok & Mauro.
his attorneys (No Model.) 2 Sheets—Sheet 2.
P. ARGALL.
APPARATUS FOR EXTRACTION OF PRECIOUS METALS.
No. 549,622. Patented Nov. 12, 1895.
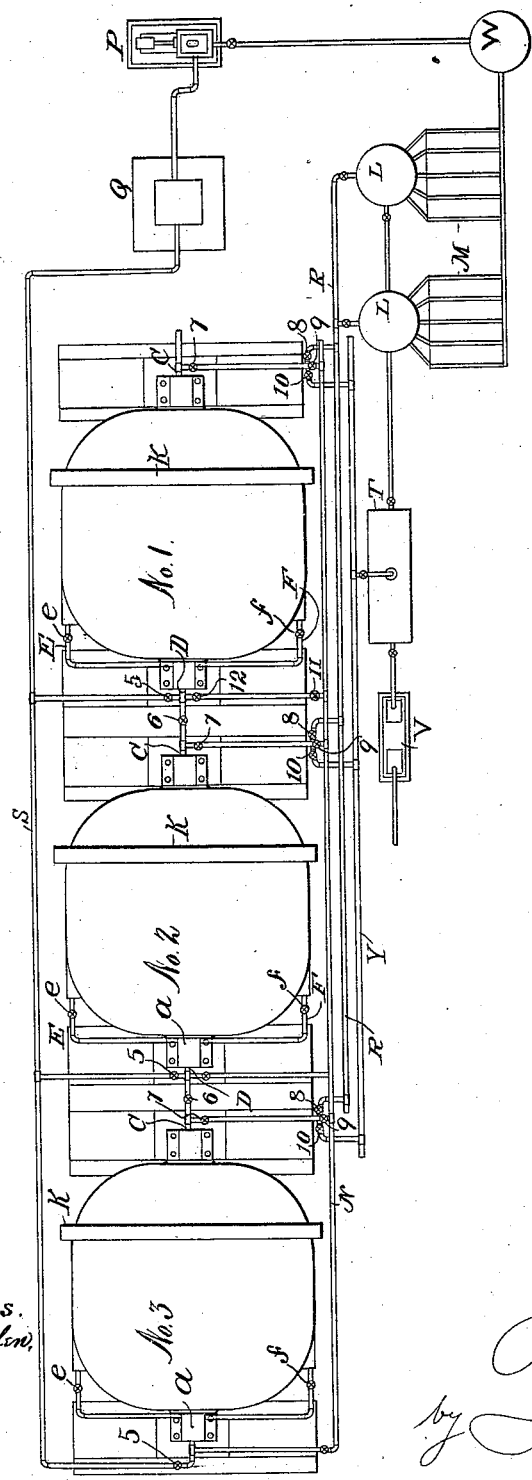

UNITED STATES PATENT OFFICE.

PHILIP ARGALL, OF DENVER, COLORADO.

APPARATUS FOR EXTRACTION OF PRECIOUS METALS.

SPECIFICATION forming part of Letters Patent No. 549,622, dated November 12, 1895.

Application filed November 6, 1894. Serial No. 528,046. (No model.)

*To all whom it may concern:*

Be it known that I, PHILIP ARGALL, of Denver, Colorado, have invented new and useful Improvements in Apparatus for Extraction of Precious Metals, &c., which is fully set forth in the following specification.

In the treatment of ores by the cyanide process to extract their gold and silver contents it is the usual practice to place the ores in open leaching-tanks and allow the cyanide solution to percolate through the mass and so dissolve and remove the precious metals in solution. This method is on the whole fairly efficient, but it occupies considerable time (forty to eighty hours) and causes a large consumption of cyanide through decomposition, owing to its long contact with the ore and atmosphere. With many classes of ore, however, it is found that agitation of the ore and solution is necessary in order to obtain the best results or largest extraction of precious metals. Particularly is this the case with silver-bearing ores or ores carrying considerable value in silver.

The agitators heretofore in use shorten the time necessary to dissolve the precious metals; but they invariably cause a large consumption of cyanide, due chiefly to the continuous agitation of the solution in open tanks or in partly-filled barrels in the presence of an excess of air, while the ore when discharged from the agitators is in such a condition that very often it cannot be leached, or at best but part of the cyanide solution containing the dissolved gold can be separated from the ores. Then again, the agitators now in use are of such small capacity as to add largely to the cost of treating the ores.

My invention relates to a new machine for treating ores by continuous agitation and continuous percolation under pressure or by means of vacuum and either with or without external or additional heat.

The invention includes other features of a minor or subsidiary character, which will be explained, in connection with the accompanying drawings, in which—

Figure 1:
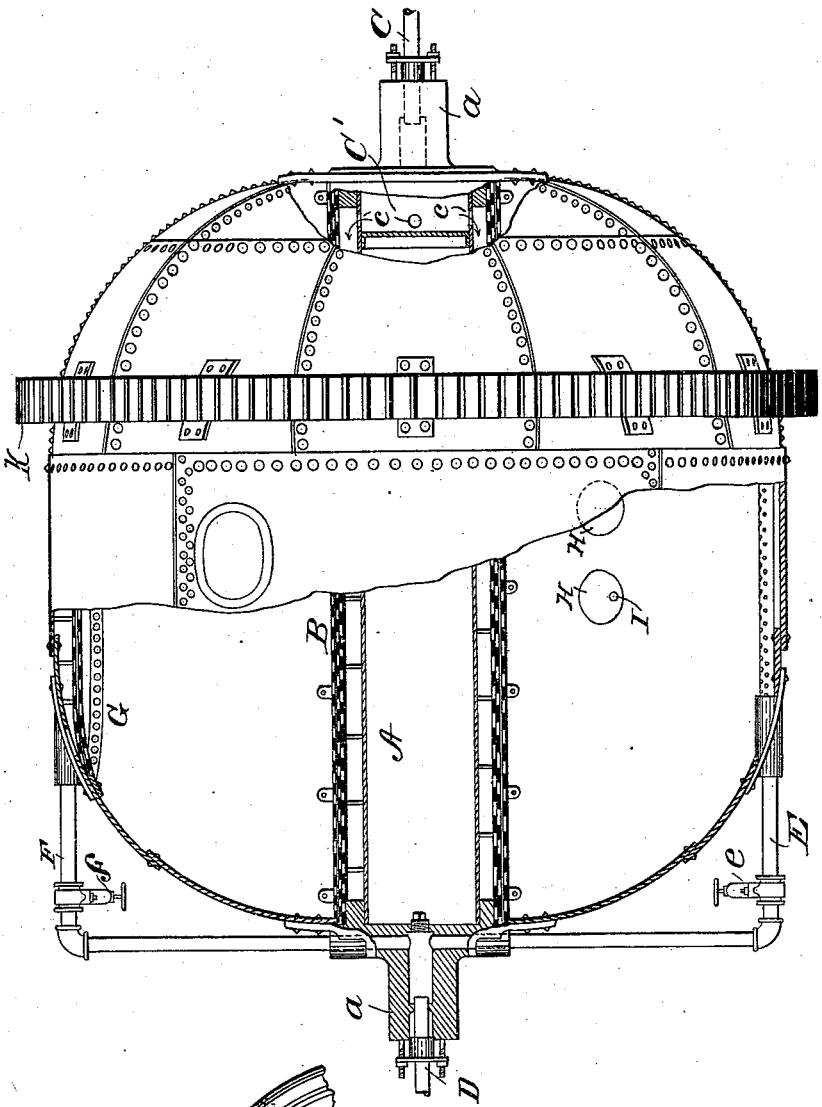
Figure 3:
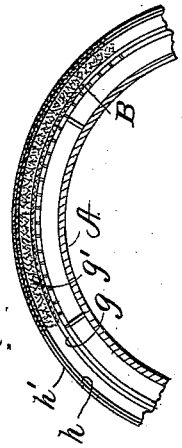

Figure 1 is a view, partly in elevation and partly in section, of a percolator constructed in accordance with the invention. Fig. 2 is a diagram illustrating an arrangement of various parts of a plant for extracting precious metals according to my invention. Fig. 3 is an enlarged sectional detail illustrating the construction of the filtering-walls.

The percolator shown in Fig. 1 may have a capacity of from ten to one hundred tons of ore per charge. A convenient size for practical working would be a vessel having a capacity of twenty-five tons. Its ends are preferably spherical, as shown, but matters of shape and size are not essential.

Extending longitudinally through the center of the vessel is a tube A, which for a vessel of twenty-five tons capacity should be about thirty inches in diameter. This tube is riveted or bolted firmly to the ends or trunnions $a$ of the percolator, thus forming a rigid axis for the machine. Around this central tube A a perforated tube B is attached and firmly held in position (as by means of stay-bolts) in such a manner as to leave an annular space of three or more inches between the tubes A and B. This annular space is designed for the free circulation of the solutions, which may enter or leave the space through the pipe C, according to the conditions under which the percolator is being operated. Pipe C, as shown, communicates with a chamber C' in the end of tube A, which chamber communicates through passages $c$ with the annular space above referred to. A sheet $g$, Fig. 3, of No. 4 or No. 6 mesh steel or iron wire screen is attached closely to the periphery of the perforated tube B in order to facilitate the passage of solutions between the perforations in the pipe B. I next cover this steel-wire screen with one or more thicknesses $g'$ of cocoanut matting, asbestos cloth, or similar material to form the body of the filter and over this I place one or more sheets of duck $h$, burlap, or similar material to form the main filtering medium, while to prevent the destruction of this duck or burlap through the attrition of the ore or through pressure applied from the annular space within the filter I cover it with an envelope $h'$, of perforated steel plate or stout No. 8 mesh steel-wire cloth, firmly held in place by any suitable means. I thus obtain a concentric annular filter, through which continuous percolation of the solution (which has previously passed through the charge of ore) can be secured while the percolator is being revolved.

It will be of course understood that the particular construction of the filtering-wall is not an essential matter and that any construction suitable to the end in view may be substituted for that described.

The shell of the revolving percolator is preferably made of steel, substantially as shown, and the machine is designed to revolve on the hollow trunnions a, through which the solution-pipes pass, leading to the annular space within the filter and to the interior of the revolving percolator. I do not, however, limit myself to mounting the percolator on hollow trunnions, as the same results can be obtained by other means. The shell is shown as surrounded by a toothed gear or worm wheel K, by means of which the percolator can be rotated.

A pipe D, with two or more branches E and F, containing valves e f, communicates through one of the hollow trunnions with the interior of the revolving percolator. This pipe D, with its branches E and F, is used to convey cyanide solution, water, air, or steam to the interior of the percolator, as one or other of these fluids may be required in the process of treating ores. That part of pipe E which lies within the percolator is perforated, as shown, while that portion of pipe F within the percolator is covered by a segmental filter G.

When filtration by replacement is desirable, segmental filter G is called into operation. In this way filtration by replacement can be carried on, first, to the depth corresponding to the bottom of the concentric annular filter by simply allowing the percolator to remain at rest and admitting water through the pipe E. Then when the solution has been displaced to the depth indicated water or solution under pressure is admitted by the pipe C to the space within the filter, while the valve f of the pipe F, attached to the segmental filter, is opened and the rich solution driven out through the pipes F and D.

The construction of the apparatus being now understood, I will explain the operation in connection with which it is employed.

A charge of, say, twenty-five tons of ore is admitted through the charge-holes H H. The covers are then firmly screwed on and a valve I opened. Cyanide solution is then admitted through the pipe E until the excess of air in the percolator is displaced and the solution begins to discharge through the valve I, which is then closed. The air occluded in the pulverized charge of ore will usually be ample to supply the oxygen necessary for the reaction between the gold and cyanide solution. Should additional air be required, however, it can be injected into the percolator. The air so injected should preferably be first passed over quicklime to abstract and remove the carbonic acid therefrom, thus producing an economical oxidizing agent inert, or nearly so, on the cyanide solution. Suitable means, such as a pump P and an accumulator Q, (indicated in Fig. 2,) are used to circulate the solution and maintain a pressure on the ore and solution within the percolator—that is to say, the pump draws the solution through the pipe C from within the filter and discharges it through the accumulator and pipe E on top of the ore within the percolator and thus maintains continuous percolation and continuous circulation. The percolator is revolved under the pressure of cyanide solution, found most suitable for the desired rate of percolation, say a pressure of ten to twenty pounds per square inch. In the course of a few hours the greater part of the gold will be in solution. Then connection can be made between the pipe C and the precipitation-boxes, while the pipe D remains in connection with the accumulator, so that the fresh cyanide solution under pressure from the accumulator passes in through the pipe E, percolates through the ore and concentric annular filter as the percolator revolves, removing the gold in solution and carrying it out through the pipe C to the precipitation-boxes. The machine is thus revolved under pressure and the percolation continued until the precious metals are extracted within workable limits. Air is then admitted through the pipe E, while the pipe C is connected with a vacuum-pump, and as the percolator revolves the cyanide solution is drawn off, and finally water is admitted through the pipe E, and the cyanide solution displaced by the water is driven out through the concentric annular filter and the segmental filter, as hereinbefore described. The covers of the charge-holes H H are then removed and the percolator revolved with fresh water passing into it, through both filter and the pipe E, until it is discharged of ore and the filters thoroughly cleansed. The percolator is then ready for another charge. Preferably, however, when the greater part of the gold is brought into solution by means of the continuous percolation and circulation process I draw off this rich gold solution without dilution and pass it through the precipitation-boxes. To this end I disconnect the pipe C from the circulating-pump and connect it with the vacuum, admitting air through the pipe E at atmospheric pressure or compressed to one or two atmospheres. The percolator is then revolved and filtering by means of air-pressure above the ore-charge and vacuum within the filter continued until the rich solution is drawn off. The air in the percolator is then replaced by a weak solution of cyanide and the continuous process of percolation and circulation continued, as described, until the precious metals are extracted within workable limits. This weak solution can then be drawn off in a similar manner to the strong or rich solution, water added, and finally the percolator discharged, as hereinbefore described.

The operation of the machine can be varied—as, for example, sufficient solution can be added to the ore to dissolve all the precious metals. The percolator can then be revolved under the desired pressure of solution until the precious metals are dissolved, when the solution can be drawn off, as above described. In this way the minimum quantity of solution would be used.

While it will be seen that the revolving percolators can be operated singly, I prefer to operate them in a series of three or more machines so arranged that each percolator can in turn become the first, intermediate, and last in the series. For example, three percolators may be connected in series, as in Fig. 2, No. 1 having been last charged with ore, No. 2 having a charge of ore about half done, and No. 3 a charge of ore almost completed. The strong and fresh solution enters percolator No. 3 from the supply-pipe S, connected with the pump P and accumulator Q. As shown, this supply-pipe connects by branches with all the inlet-pipes D E of the percolators, these branches containing each a valve 5. In the operation now described the valves 5 of Nos. 1 and 2 are closed and that of No. 3 open. The solution passes through the ore in No. 3 and through its concentric annular filter, leaving it by pipe C, valve 6 between it and pipe D of No. 2 being open. In like manner the solution passes through No. 1 and thence by return-pipe R to the settling-tanks L and precipitation-boxes M, valves 7 and 8 being open.

If it be desired to cut out one of the percolators—say No. 2—for emptying and recharging, this may be effected and communication continued between Nos. 1 and 3 by means of the byway-pipe N. To this end valves 6, between Nos. 1 and 2 and between Nos. 2 and 3, are closed, valves 7 and 9, between No. 3 and the byway-pipe N, are opened, and valves 11 and 12, between the latter and inlet-pipe D of No. 1, are also opened. The solution, freed from gold in the precipitation-boxes, flows into the sump W, whence it is lifted by pump P and again circulated through the system of percolators.

When the process of filtering by simultaneously maintaining a pressure of water or other fluid above the filter and a vacuum beneath or within it is used, the return-pipe R is cut off, all the valves 8 being closed and valve 10 of No. 1 is opened, connecting the system with the vacuum-pipe Y, vacuum-tank T, and vacuum-pump V. The vacuum-tank is connected with the settlers L, so that it can be drained into them when full.

Should the cyanide solution after passing once through the series of percolators not be rich enough in gold, it can be continuously circulated through the system, as described in using a single percolator, until it becomes saturated. In this way is obtained a solution very rich in gold and a very high gold precipitate in the boxes, and a high and rapid extraction of the metals from the ores under treatment is effected with the utmost expediency and economy.

This system of operating the revolving percolator in series I call the "continuous percolation process." By means of these percolators, operated singly or in series, I can treat ores by either hot or cold cyanide solutions and under the pressure found most advantageous for the rapid solution of the precious metals. I thus secure continuous agitation and percolation, and rapid and efficient extraction with a minimum expenditure of chemicals and at a very low cost. This revolving percolator and continuous-percolation process are equally applicable to almost all those processes where percolation and agitation are necessary to extract the metals from their ores, though of course the materials used in the construction of the interior of the percolator would either vary with the nature of the fluid used in the extraction process or the vessel would be lined with non-corrosive metal. It will be understood, therefore, that where cyanide solutions are mentioned it is intended to include solutions which would be the equivalents thereof for the purposes of this invention.

It will be noted that the concentric annular tubes of the percolator serve a double purpose, acting as a filtering apparatus and also forming an axis for the percolator, giving it great strength and rigidity and making possible the construction of large vessels capable of revolving with loads of twenty-five tons and upward.

Having thus described my invention, what I claim as new, and desire to secure by Letters Patent, is—

1. A percolator for treating ores by the cyanide process comprising an outer shell capable of being closed air-tight hollow trunnions upon which said vessel rotates, concentric tubes extending axially through the vessel, the outer tube being covered by a filtering medium, a passage connecting the annular space between the tubes with one of the hollow trunnions, and a pipe communicating with the chamber surrounding the outer tube substantially as described.

2. A percolator for treating ores comprising a shell having spherical ends, a tubular filter extending axially through the vessel, a solid tube within the filtering tube and forming with the latter an annular space, hollow trunnions upon which the vessel rotates, a pipe leading through one trunnion to the said annular space, pipes leading from the other trunnion into the space surrounding the concentric tubes, and a segmental filter placed over the end of one of said pipes, substantially as described.

3. The combination of a plurality of percolators journaled in bearings and connected in series, each containing a filter, a by-way pipe having connections to each percolator and valves whereby any percolator can be cut out of the system and connection maintained between those that remain, a pump, a supply pipe leading therefrom to the percolators, precipitation boxes and a return pipe leading thereto from the percolators, substantially as described.

4. The combination of a series of percolators connected by pipes and containing each a filter, a pump, a supply pipe leading therefrom to the percolators, a vacuum pipe leading therefrom, and a vacuum pump connected with said pipe, substantially as described.

In testimony whereof I have signed this specification in the presence of two subscribing witnesses.

PHILIP ARGALL.

Witnesses:
W. L. AUSTIN,
W. WESTON.